United States Patent
Mimran

(10) Patent No.: US 10,417,287 B2
(45) Date of Patent: Sep. 17, 2019

(54) COMPRESSING SHORT TEXT MESSAGES

(76) Inventor: David Mimran, Tel Aviv (IL)

(*) Notice: Subject to any disclaimer, the term of this patent is extended or adjusted under 35 U.S.C. 154(b) by 280 days.

(21) Appl. No.: 12/774,176

(22) Filed: May 5, 2010

(65) Prior Publication Data

US 2011/0276576 A1  Nov. 10, 2011

(51) Int. Cl.
  *G06F 17/30* (2006.01)
  *G06F 16/951* (2019.01)
(52) U.S. Cl.
  CPC ................... *G06F 16/951* (2019.01)
(58) Field of Classification Search
  USPC .................................................. 707/730, 741
  See application file for complete search history.

(56) References Cited

U.S. PATENT DOCUMENTS

| | | | | |
|---|---|---|---|---|
| 5,566,001 A | * | 10/1996 | Saidi et al. | 358/426.02 |
| 7,263,528 B2 | * | 8/2007 | Haff et al. | 707/622 |
| 7,404,148 B2 | * | 7/2008 | Lincke et al. | 715/805 |
| RE40,459 E | * | 8/2008 | Hawkins et al. | 709/219 |
| 8,001,485 B2 | * | 8/2011 | Sipher et al. | 715/805 |
| 2002/0199001 A1 | * | 12/2002 | Wenocur et al. | 709/227 |
| 2002/0199096 A1 | * | 12/2002 | Wenocur et al. | 713/153 |
| 2003/0009694 A1 | * | 1/2003 | Wenocur et al. | 713/201 |
| 2003/0041110 A1 | * | 2/2003 | Wenocur et al. | 709/206 |

* cited by examiner

*Primary Examiner* — Don Wong
*Assistant Examiner* — Kim Nguyen
(74) *Attorney, Agent, or Firm* — Browdy and Neimark, PLLC

(57) ABSTRACT

A method of compressing short text messages, comprising: generating an index code comprising an association of keywords in the text messages with indices, the index code is logically divided into segments of variable size, each segment comprising at least one bucket, being a constant range of indices; adjusting the index code according to a natural keyword frequency distribution and to statistical analysis of the text messages; associating short indices with frequent keywords in the text messages; converting the text messages into compressed text messages in which at least some of the keywords are replaced by the associated indices; and updating the association between the indices and the keywords, updating the segments, and updating the updating frequency in respect to a usage keyword frequency distribution and temporal changes thereof.

13 Claims, 4 Drawing Sheets

COMPRESSING SHORT TEXT MESSAGES

BACKGROUND

1. Technical Field

The present invention relates to the field of communications, and more particularly, to communicating via text messages.

2. Discussion of Related Art

Communicating via text messages is very common, and demands evermore increasing resources from communication devices. Various ways of coding the messages still sets high demands on the devices.

The following patents and patent applications are incorporated herein by reference in their entirety: WIPO Publication No. 9222141 which discloses a data compression using multiple levels; U.S. Pat. No. 6,611,213 which discloses a method and apparatus for data compression using fingerprinting; WIPO Publication No. 8501814 which discloses a method and apparatus for data compression; U.S. Pat. No. 7,155,173 which discloses a method and system for providing a context for message compression; WIPO Publication No. 2009045668 which discloses a two-pass hash extraction of text strings; WIPO Publication No. 0241499 which discloses a system and method for communicating with temporary compression tables; U.S. Pat. No. 7,417,943 which discloses a dynamic compression training method and apparatus; WIPO Publication No. 9840969 which discloses a text file compression system; U.S. Pat. No. 6,067,381 which discloses a method of reinitializing dictionaries in a data transmission system using data compression; U.S. Pat. No. 7,348,904 which discloses a selective updating of compression dictionary; WIPO Publication No. 2008075235 which discloses a method, communications node, and memory for dynamic dictionary updating and optimization for compression and decompression of messages; U.S. Pat. No. 7,143,191 which discloses a protocol message compression in a wireless communications system; U.S. Patent Publication No. 20080270117 which discloses a method and system for text compression and decompression; and U.S. Pat. No. 5,991,713 which discloses a efficient method for compressing, storing, searching and transmitting natural language text.

BRIEF SUMMARY

Embodiments of the present invention provide a data processing system for compressing short text messages exchanged between at least two communication devices, comprising: a managing module arranged to manage an index code comprising an association of a plurality of keywords in the text messages with indices, and comprising an analyzer arranged to adjust the index code according to statistical analysis of the text messages; and an application arranged to convert the text messages into compressed text messages in which at least some of the keywords are replaced by the associated indices; and to convert compressed text messages into text messages by replacing indices with the associated keywords, the application is embeddable in the communication devices, wherein the managing module is connected via at least one communication link with the embedded applications in the communication devices and is arranged to update the index code of each application in respect to the statistical analysis, wherein the index code is logically divided into segments of variable size, each segment comprising at least one bucket, being a constant range of indices, wherein the management of the index code comprises updating the association between the indices and the keywords; and updating the segments and their sizes, in respect to a natural keyword frequency distribution, a usage keyword frequency distribution, and temporal changes thereof, wherein the analyzer is arranged to associate short indices with frequent keywords in the text messages, and wherein a frequency of the updating of the index code is reduced by adapting the index code in respect to the usage keyword frequency distribution, the segments, their size and the temporal changes thereof.

Accordingly, according to an aspect of the present invention, there is provided a data processing system, wherein the index code is defined and managed within at least one of the communication devices independently of other communication devices.

Accordingly, according to another aspect of the present invention, there is provided a data processing system, wherein at least one of the communication devices comprises a web server, that may have the managing module is embedded therein.

Accordingly, according to yet another aspect of the present invention, there is provided a data processing system, wherein the communication devices are cellular communication devices and/or are associated with users.

Accordingly, according to still another aspect of the present invention, there is provided a data processing system, wherein the application further comprises a managing module arranged to update the index code.

Accordingly, according to another aspect of the present invention, there is provided a data processing system, wherein one of the communication devices is defined as a sender, and the application embedded therein manages the index code.

Embodiments of the present invention provide a method of compressing short text messages, comprising: generating an index code comprising an association of a plurality of keywords in the text messages with indices, the index code is logically divided into segments of variable size, each segment comprising at least one bucket, being a constant range of indices; adjusting the index code according to a natural keyword frequency distribution; adjusting the index code according to statistical analysis of the text messages; associating short indices with frequent keywords in the text messages; converting the text messages into compressed text messages in which at least some of the keywords are replaced by the associated indices; updating the association between the indices and the keywords in respect to a usage keyword frequency distribution and temporal changes thereof; updating the segments and their sizes in respect to the usage keyword frequency distribution, the temporal changes thereof, and statistical analysis thereof; and adapting an updating frequency of the index code in respect to the usage keyword frequency distribution, the segments, their sizes and the temporal changes thereof.

Accordingly, according to an aspect of the present invention, there is provided a method, further comprising saving temporary updates and approving them upon detecting use constancy, that may comprise: checking for changes in the usage keyword frequency distribution; generating a temporary index code update based upon the changes; statistically analyzing a constancy of the changes over time; and updating the index code if the changes are constant for a specified period according to the statistical analysis.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
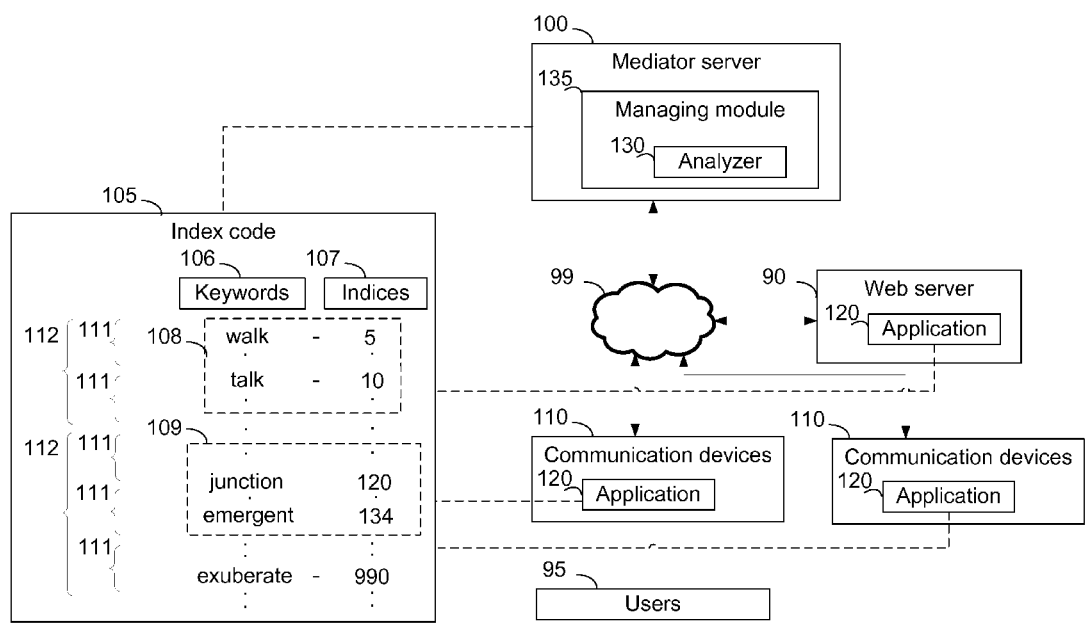
FIGS. 1 and 2 are high level schematic block diagrams of a data processing system for compressing short text messages exchanged between at least two communication devices, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
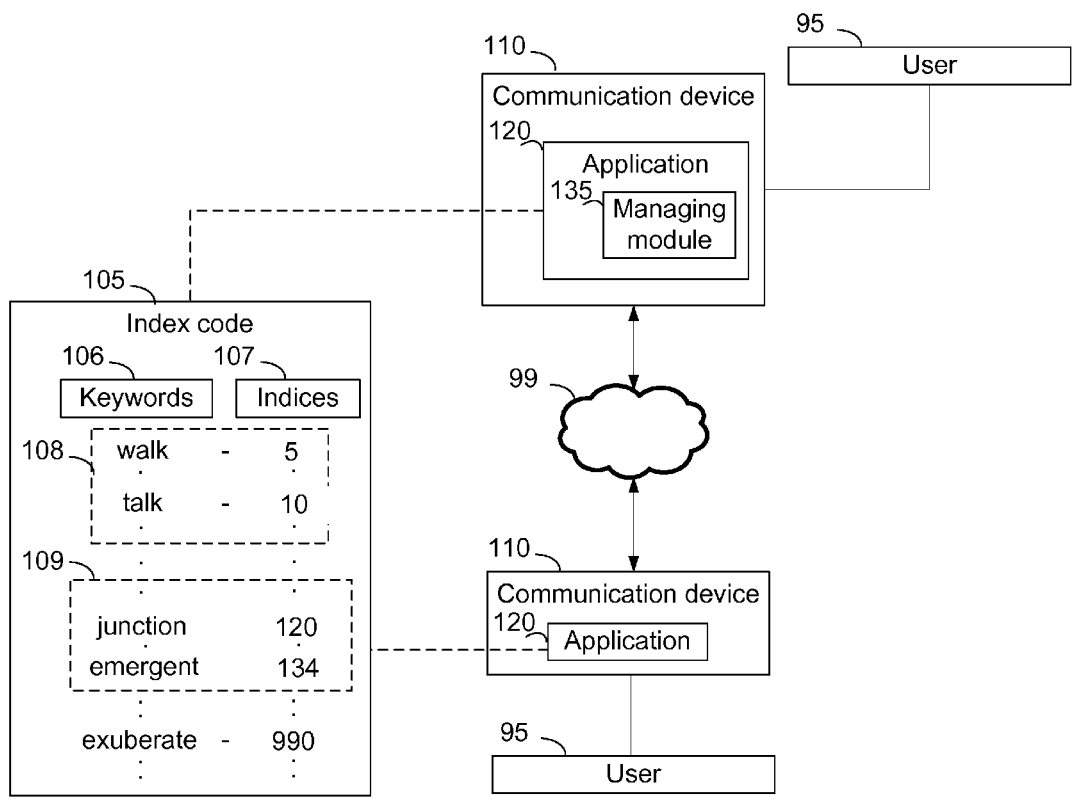

FIGS. 1 and 2 are high level schematic block diagrams of a data processing system for compressing short text messages exchanged between at least two communication devices 110, according to some embodiments of the invention. The data processing system comprises a mediator server 100 comprising a managing module 135 arranged to manage an index code 105 comprising an association of a plurality of keywords 106 in the text messages with indices 107. Mediator server 100 comprises an analyzer 130 arranged to adjust index code 105 according to statistical analysis of the text messages. The data processing system further comprises an application 120 that is embeddable in communication devices 110 and arranged to: convert the text messages into compressed text messages in which at least some of keywords 106 are replaced by the associated indices 107; and to convert compressed text messages into text messages by replacing indices 107 with the associated keywords 106.

According to some embodiments of the invention, managing module 135 is part of application 120 (FIG. 2) and allows index code management from communication devices 110. For example, a sender communication device 110 may manage index code 105 in its communication with other communication devices 110.

According to some embodiments of the invention, mediator server 100 is connected via at least one communication link 99 with embedded applications 120 in communication devices 110 and is arranged to update index code 105 of each application 120 in respect to the statistical analysis.

Index code 105 is logically divided into segments 112 of variable size, wherein each segment 112 comprises at least one bucket 11, being a constant range of indices 107. Analyzer 130 may be arranged to associate short indices with frequent keywords in the text messages, for example, keywords 106 that are more common may be associated with shorter indices 107, as denoted by box 108, while rarer keyword 106 may be associated with longer indices 107, as denoted by box 109.

The management of index code 105 comprises: updating the association between indices 107 and keywords 106; and updating segments 112 and their sizes, in respect to a natural keyword frequency distribution, a usage keyword frequency distribution, and temporal changes thereof. The frequency of the updating of index code 105 is reduced by adapting index code 105 in respect to the usage keyword frequency distribution, the segments, their size and the temporal changes thereof.

The data processing system may be applied for sending short text messages between communication devices 110, communication devices 120 and web servers 90 (in which application 120 is likewise embeddable), such as in cellular applications, and communication devices 110 associated with users 95, for example in peer to peer applications. In embodiments, mediator server 100 may be embedded in web server 90.

When one of communication devices 110 or web servers 90 is typically the sender of the short text messages, the sender may manage the updates of index code 105.

Index codes 105 may be defined and managed in respect to each pair of communication devices 110 independently of other communication devices 110 associated with mediator server 100.

According to some embodiments of the invention, managing index code 105 may be carried out by application 120 in communication device 110 itself, without need of constant management by mediator server 100 or analyzer 130. Application 120 may further comprise a managing module (not shown) arranged to update index code 105. Applications 120 may be managed in the short term by modules within application 120 themselves, and in long term, or periodically, by mediator server 100.

Figure 3:
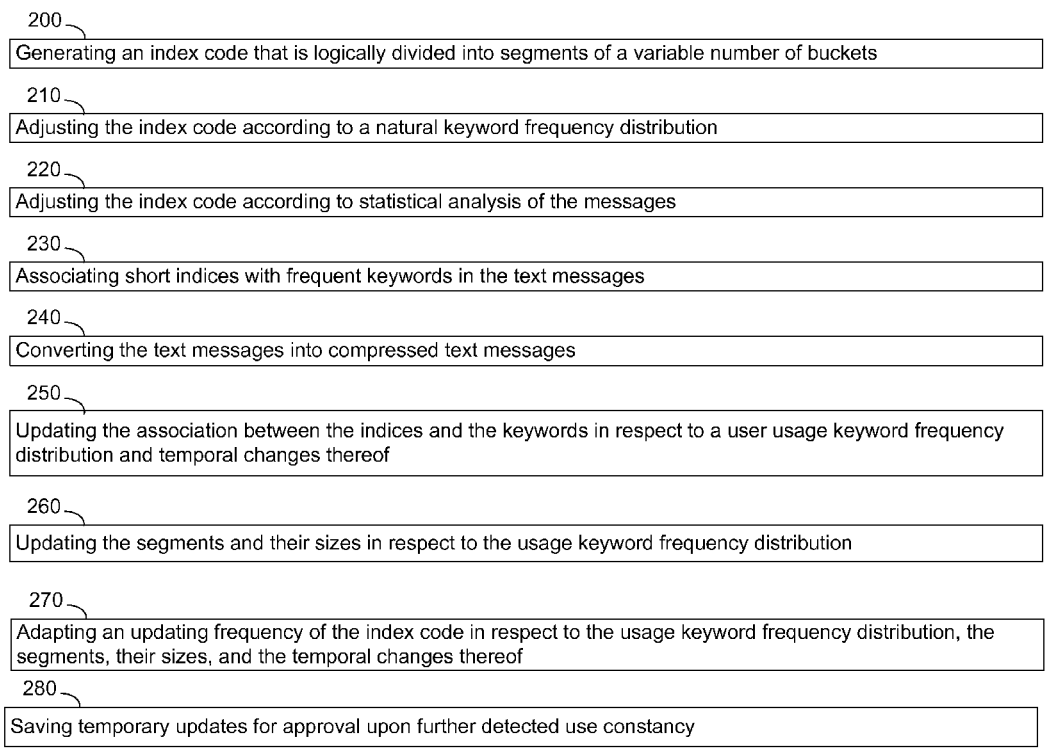
FIGS. 3 and 4 are high level flowcharts illustrating a method of compressing short text messages according to some embodiments of the invention.
Figure 4:
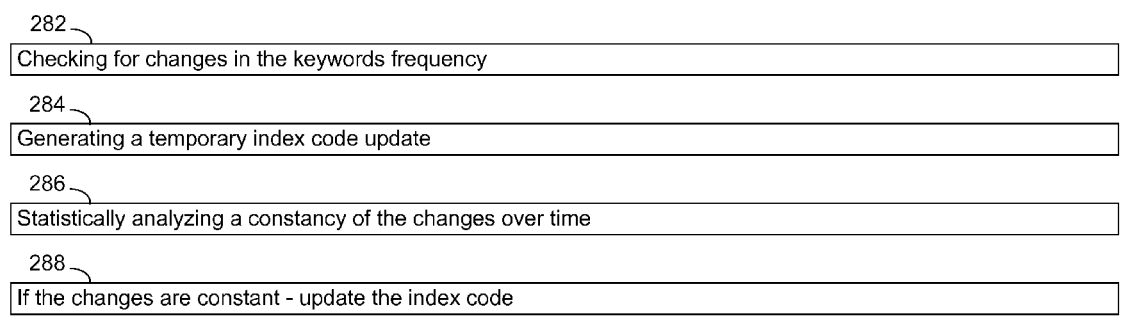

FIGS. 3 and 4 are high level flowcharts illustrating a method of compressing short text messages according to some embodiments of the invention. The method comprises the following stages: generating an index code comprising an association of a plurality of keywords in the text messages with indices (stage 200); adjusting the index code according to a natural keyword frequency distribution (stage 210); adjusting the index code according to statistical analysis of the text messages (stage 220); associating short indices with frequent keywords in the text messages (stage 230); converting the text messages into compressed text messages in which at least some of the keywords are replaced by the associated indices (stage 240); updating the association between the indices and the keywords in respect to a usage keyword frequency distribution and temporal changes thereof (stage 250); updating the segments and their sizes in respect to the usage keyword frequency distribution, the temporal changes thereof, and statistical analysis thereof (stage 260); and adapting an updating frequency of the index code in respect to the usage keyword frequency distribution, the segments, their sizes and the temporal changes thereof (stage 270).

The index code may be logically divided into segments of variable size, each segment comprising at least one bucket, being a constant range of indices.

According to some embodiments of the invention, the method may further comprise saving temporary updates and approving them upon detecting use constancy (stage 280), which may comprise the following stages: checking for changes in the usage keyword frequency distribution (stage 282); generating a temporary index code update based upon the change (stage 284); statistically analyzing a constancy of the changes over time (stage 286); and updating the index code if the changes are constant for a specified period according to the statistical analysis (stage 288).

Embodiments of the present invention include tangible computer readable storage media readable by a general purpose computer, including but not limited to, storage media such as magnetic storage media (e.g., ROM's, floppy disks, hard disks, etc.), and optically readable media (e.g., CD-ROMs, DVDs, etc.).

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A data processing system for compressing short text messages exchanged between at least two communication devices, comprising: a processor;
   a managing module arranged to manage an index code comprising an association of a plurality of keywords in the text messages with indices, and comprising an analyzer arranged to adjust the index code according to statistical analysis of the text messages; and
   an application arranged (i) to convert the text messages into compressed text messages in which at least some of the keywords are replaced by the associated indices and (ii) to convert compressed text messages into text messages by replacing indices with the associated keywords, the application is embeddable in the communication devices,
   wherein the managing module is connected via at least one communication link with the embedded applications in the communication devices and is arranged to update the index code of each application in respect to the statistical analysis,
   wherein the index code is logically divided into segments of variable size, each segment comprising at least one bucket, being a constant range of indices,
   wherein the management of the index code comprises updating the association between the indices and the keywords; and updating the segments and their sizes, in respect to a natural keyword frequency distribution, a usage keyword frequency distribution, and temporal changes thereof,
   wherein the analyzer is arranged to associate short indices with frequent keywords in the text messages, and
   wherein a frequency of the updating of the index code is reduced by adapting the index code in respect to the usage keyword frequency distribution, the segments, their size and the temporal changes thereof.

2. The data processing system of claim 1, wherein the index code is defined and managed in at least one of the communication devices independently of all other communication devices.

3. The data processing system of claim 1, further comprises a web server.

4. The data processing system of claim 3, wherein the managing module is embedded in the web server.

5. The data processing system of claim 1, wherein the managing module is embedded in a mediator server connected to the communication devices via a communication link.

6. The data processing system of claim 1, wherein the communication devices are cellular communication devices.

7. The data processing system of claim 1, wherein the communication devices are associated with users.

8. The data processing system of claim 1, wherein the application further comprises the managing module arranged to update the index code.

9. The data processing system of claim 8, wherein one of the communication devices is defined as a sender, and the application embedded therein manages the index code.

10. A method of compressing short text messages, comprising:
   generating an index code comprising an association of a plurality of keywords in the text messages with indices, the index code being logically divided into segments of variable size, each segment comprising at least one bucket, being a constant range of indices;
   adjusting the index code according to a natural keyword frequency distribution;
   adjusting the index code according to statistical analysis of the text messages;
   associating short indices with frequent keywords in the text messages;
   converting the text messages into compressed text messages in which at least some of the keywords are replaced by the associated indices;
   updating the association between the indices and the keywords in respect to a usage keyword frequency distribution and temporal changes thereof;
   updating the segments and their sizes in respect to the usage keyword frequency distribution, the temporal changes thereof, and statistical analysis thereof; and
   adapting an updating frequency of the index code in respect to the usage keyword frequency distribution, the segments, their sizes and the temporal changes thereof.

11. The method of claim 10, further comprising saving temporary updates and approving them upon detecting use constancy.

12. The method of claim 11, wherein the saving temporary updates and approving them upon detecting use constancy comprises:
   checking for changes in the usage keyword frequency distribution;
   generating a temporary index code update based upon the changes;
   statistically analyzing a constancy of the changes over time; and
   updating the index code if the changes are constant for a specified period according to the statistical analysis.

13. A computer readable storage medium encoded with processing instructions for causing a computer processor to execute a method of compressing short text messages, the method comprising:
   generating an index code comprising an association of a plurality of keywords in the text messages with indices, the index code being logically divided into segments of variable size, each segment comprising at least one bucket, being a constant range of indices;
   adjusting the index code according to a natural keyword frequency distribution;
   adjusting the index code according to statistical analysis of the text messages;
   associating short indices with frequent keywords in the text messages;
   converting the text messages into compressed text messages in which at least some of the keywords are replaced by the associated indices;
   updating the association between the indices and the keywords in respect to a usage keyword frequency distribution and temporal changes thereof;
   updating the segments and their sizes in respect to the usage keyword frequency distribution, the temporal changes thereof, and statistical analysis thereof; and
   adapting an updating frequency of the index code in respect to the usage keyword frequency distribution, the segments, their sizes and the temporal changes thereof.

* * * * *